United States Patent [19]

Bielby

[11] 4,266,449

[45] May 12, 1981

[54] METHOD FOR MAKING A CUTTING TOOL

[76] Inventor: Robert A. Bielby, 30328 Fink, Farmington, Mich. 48024

[21] Appl. No.: 87,251

[22] Filed: Oct. 22, 1979

Related U.S. Application Data

[63] Continuation-in-part of Ser. No. 895,296, Apr. 11, 1978, abandoned.

[51] Int. Cl.³ .............................................. B21K 5/04
[52] U.S. Cl. ............................... 76/101 A; 76/101 B; 164/46; 407/119
[58] Field of Search ............. 76/101 R, 101 A, 101 B, 76/108 R, 108 T, DIG. 11, DIG. 2, DIG. 4; 408/144; 427/249; 164/46, 14, 72; 407/119

[56] References Cited

U.S. PATENT DOCUMENTS

| 2,537,818 | 1/1951 | Evans ................................. 76/101 A |
| 3,564,683 | 2/1971 | Schedler et al. ..................... 407/119 |
| 3,882,579 | 5/1975 | Peacock ............................. 76/101 A |

Primary Examiner—Roscoe V. Parker
Attorney, Agent, or Firm—Charles W. Chandler

[57] ABSTRACT

A method for making a cutting tool such as a tap, reamer or the like, in which the entire surface of a soft high speed steel blank is coated with a formation of titanium nitride, heat treated, and then finish ground by conventional means to define the cutting edges.

10 Claims, 5 Drawing Figures

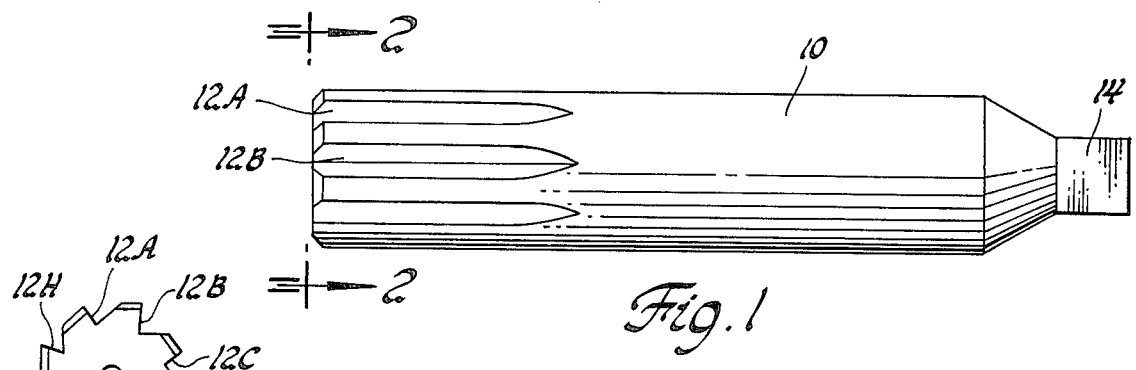
Fig. 1
Fig. 2
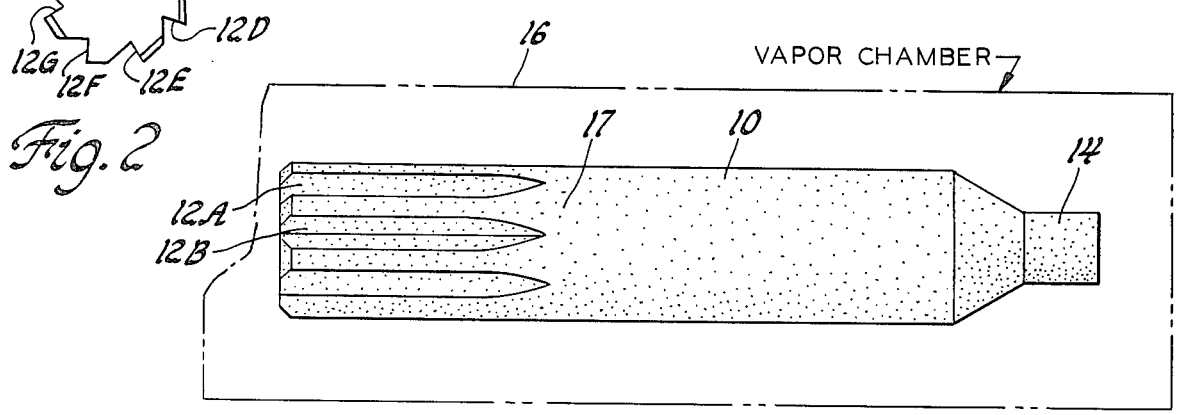
Fig. 3
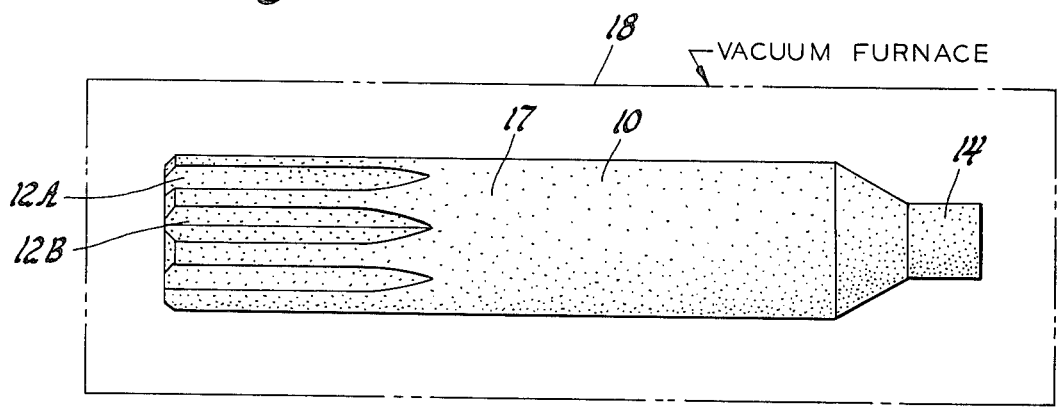
Fig. 4
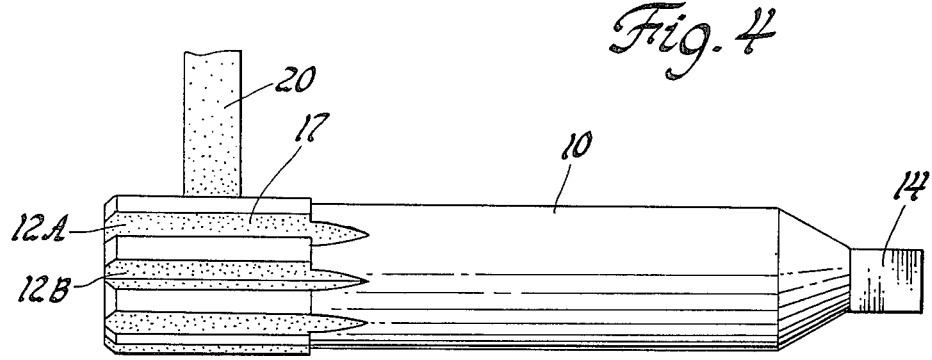
Fig. 5

METHOD FOR MAKING A CUTTING TOOL

CROSS REFERENCE TO RELATED APPLICATION

This application is a continuation-in-part of application Ser. No. 895,296 filed Apr. 11, 1978 and now abandoned.

BACKGROUND OF THE INVENTION

This invention is related to cutting tools such as taps, cut-off tools, grooving tools, drills, reamers, and the like, and more particularly to a method for forming a cutting tool by coating the entire surface of a high speed steel tool blank with a high hardness coating, heat treating to a required hardness, and then removing selected portions of both the blank and the coating such that the remaining coated blank forms a cutting edge.

Certain types of cutting tools are coated in a vapor chamber with a high hardness coating such as titanium nitride to provide a useful cutting life several times that of an uncoated tool. However, heat treating the tool after the coating is applied exposes the tool to a temperature which warps the tool so that it cannot meet precise tolerances. The tool is then useless for precision work.

SUMMARY OF THE INVENTION

The broad purpose of the present invention is to provide a method for making a cutting tool in which the tool is first coated in a vapor deposition chamber, then heat treated in a vacuum chamber and then a selected portion of the tool removed so that the remaining coated edges form the cutting edges of the tool. The preferred method contemplates a reamer formed from a fluted blank in which the entire surface of the blank is coated with titanium nitride before being heat treated. The fully coated tool blank is then heat treated in a vacuum or special atmosphere furnace to maintain the condition of the coating. The outer surfaces are then ground to form precision cutting edges.

The preferred method obviates any coating build-up, as well as heat warpage that tends to destroy precision cutting edges.

The preferred method is useful for making a variety of cutting tools, such as broaches, reamers, drills, and the like. The method is also applicable for use with a variety of high hardness coatings such as titanium nitride, titanium carbide, aluminum oxide, and hafnium.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which:

FIG. 1 illustrates a blank for making a reamer;

FIG. 2 is a view as seen from the right side of FIG. 1;

FIG. 3 is a diagrammatic view illustrating the blank in a vapor chamber for the deposition of a high hardness coating;

FIG. 4 is another diagrammatic view of the blank in a vacuum furnace for heat treating; and FIG. 5 is a schematic view illustrating the step of removing a portion of the blank and the coating to form the finished tool.

DESCRIPTION OF THE PREFERRED EMBODIMENT

Referring to the drawing, FIG. 1 illustrates a fluted blank 10, formed of a high speed steel. As is well known to those skilled in the art, the blank is sized to an appropriate length and the body of the blank formed with flutes 12A-12H by a milling cutter or grinder.

The end of shank 14 is then shaped as required. The blank is then placed in a vapor chamber 16 where it is exposed to temperatures of 1800°–1900° F. or greater, as appropriate. A coating material, such as titanium nitride, is heated, vaporized, and then deposited on the entire surface of the blank. As shown in FIGS. 2 and 3, the shaded surface illustrates a high hardness coating 17. Equipment for accomplishing such a vapor deposition is well known in the art. The particular structure of such equipment is not critical to the invention and therefore is not described in detail.

The blank is then heat treated in high-temperature vacuum furnace 18, as illustrated in FIG. 4, employing temperatures determined by the particular type of high speed steel used in the blank, usually in excess of 2000° F. The heat treating process is performed in a gas atmosphere to prevent burn-off or oxidation of the high hardness coating. Suitable heat treating apparatus is also well known to those skilled in the art.

The temperatures during both the coating process and the heat treating process often cause a certain amount of distortion of the blank. The blank is then finish ground to its final shape by conventional grinding tool 20, as illustrated in FIG. 5, to remove the distortion and to provide cutting edges along the flutes defined by the full thickness of the coating material. By grinding the outside diameter after the tool blank has been exposed to the high temperatures necessary to deposit the coating and to complete the heat treating process, the cutting edges of the finished tool have very close tolerances.

The high hardness coating can be applied by any of a variety of conventional techniques, and the coating can be chosen from any of the conventional coating materials, such as titanium nitride, titanium carbide, aluminum oxide or hafnium.

Although the preferred method employs a high speed steel, it is applicable to other tool steels, such as cobalt and steels made from powdered materials.

Having described my invention, I claim:

1. A method for making a cutting tool comprising the steps of:

forming a metal cutting tool blank;

depositing on the surface of said blank in a vapor deposition chamber a high hardness coating of a first thickness;

heat treating the coated blank in a vacuum furnace; and removing metal and a portion of said high hardness coating from said blank to form a cutting edge bordering a portion of said blank in which the high hardness coating of said first thickness remains thereon.

2. A method as defined in claim 1, in which the entire surface of the blank is coated with a high hardness coating.

3. A method as defined in claim 1, in which the coating is a surface formation of titanium nitride.

4. A method as defined in claim 1, in which the coating is a formation of titanium nitride deposited on the entire surface of the tool blank.

5. A method as defined in claim 1, in which the coating is a formation of titanium carbide deposited on the entire surface of the tool blank.

6. A method as defined in claim 1, in which the coating is a formation of aluminum oxide deposited on the entire surface of the tool blank.

7. A method as defined in claim 1, in which the coating is a formation of hafnium deposited on the entire surface of the tool blank.

8. A method as defined in claim 1, in which the blank is formed of a high-speed steel.

9. A method as defined in claim 1, in which the blank is useful for shaping into a form-relieved tool.

10. A method as defined in claim 1, in which the coating is deposited in a vapor chamber in which the tool blank is exposed to temperatures of at least 1800° F.

* * * * *